(12) United States Patent
Harai

(10) Patent No.: US 11,461,057 B2
(45) Date of Patent: Oct. 4, 2022

(54) INFORMATION PROCESSING SYSTEM THAT GENERATES A LEARNING MODEL BASED ON SELECTED INPUT DATA

(71) Applicant: CANON KABUSHIKI KAISHA, Tokyo (JP)

(72) Inventor: Yuriko Harai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/066,498

(22) Filed: Oct. 9, 2020

(65) Prior Publication Data
US 2021/0109687 A1 Apr. 15, 2021

(30) Foreign Application Priority Data
Oct. 11, 2019 (JP) .............................. JP2019-187646

(51) Int. Cl.
*G06F 11/00* (2006.01)
*G06F 3/12* (2006.01)
(52) U.S. Cl.
CPC ............ *G06F 3/121* (2013.01); *G06F 3/1229* (2013.01); *G06F 3/1286* (2013.01)
(58) Field of Classification Search
CPC ......... G06F 3/121; G06F 3/1229; G06F 7/023

USPC ............................. 358/1.14, 3.24; 399/10, 43
See application file for complete search history.

(56) References Cited

U.S. PATENT DOCUMENTS

| | | | |
|---|---|---|---|
| 2003/0110413 A1* | 6/2003 | Bernklau-Halvor | ........................ G06F 11/2294 714/25 |
| 2008/0250265 A1* | 10/2008 | Chang | .................. G06F 11/0751 714/4.12 |
| 2011/0071964 A1* | 3/2011 | Horvitz | .................. G06N 7/005 706/12 |

FOREIGN PATENT DOCUMENTS

JP        2018-112852 A       7/2018

* cited by examiner

*Primary Examiner* — Jamares Q Washington
(74) *Attorney, Agent, or Firm* — Venable LLP

(57) ABSTRACT

A printer selects time-series data satisfying a condition indicating that the printer is active as input data from among time-series data obtained from a sensor. A cloud server generates a learning model that has learned to output a prediction value corresponding to a second time as output data in a case where input data until a first time is input based on the input data until the first time and teacher data that is sensor data at a second time after the first time.

14 Claims, 15 Drawing Sheets

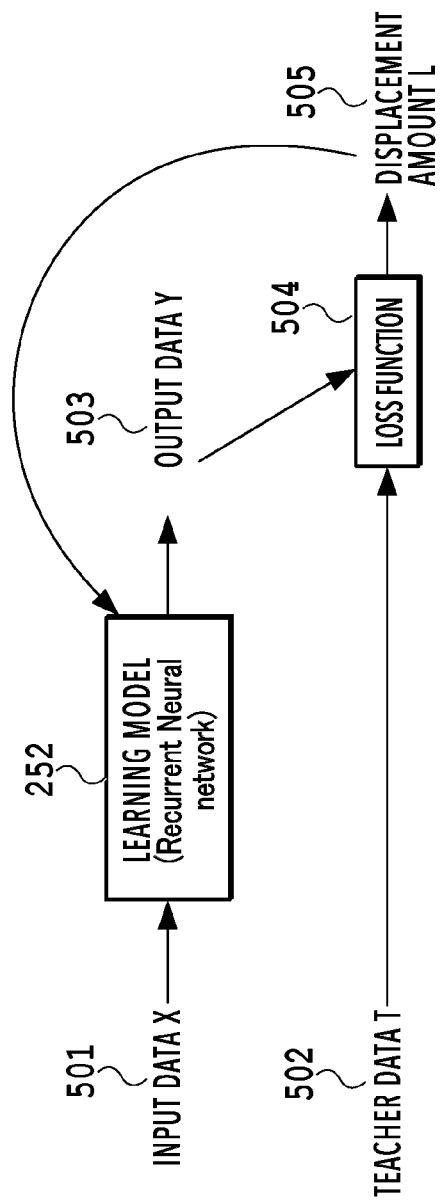
FIG.5A LEARNING
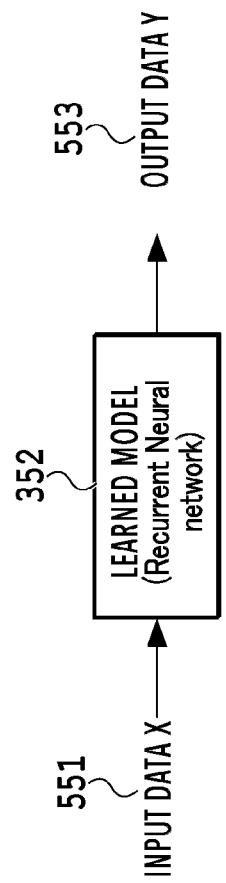
FIG.5B INFERENCE UNIT

|  | PARAMETER 1 | PARAMETER 2 | ... | PARAMETER N |
|---|---|---|---|---|
| TIME COUNT 0 | 100 | 0.6 | ... | 140 |
| TIME COUNT 1 | 230 | 0.8 | ... | 143 |
| ... | | | | |
| TIME COUNT T | 120 | 0.6 | ... | 100 |

INPUT DATA X

FIG.6A EXAMPLE OF FORMAT OF INPUT DATA X

|  | PARAMETER 1 | PARAMETER 2 | ... | PARAMETER N |
|---|---|---|---|---|
| TIME COUNT 0 | 100 | 0.6 | ... | 140 |
| TIME COUNT 1 | 230 | 0.8 | ... | 143 |
| TIME COUNT 2 | 150 | 0.6 | ... | 150 |

INPUT DATA X

|  | PARAMETER 1 | PARAMETER 2 | ... | PARAMETER N |
|---|---|---|---|---|
| TIME COUNT 3 | 130 | 0.7 | ... | 145 |

TEACHER DATA T

FIG.6B EXAMPLE OF FORMAT OF INPUT DATA X AND TEACHER DATA T IN PREDICTION OF DATA AT TIME COUNT 3 FROM DATA AT TIME COUNTS 0, 1, AND 2

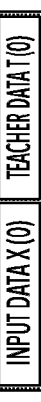
FIG.8A
FIG.8B

INFORMATION PROCESSING SYSTEM THAT GENERATES A LEARNING MODEL BASED ON SELECTED INPUT DATA

BACKGROUND OF THE INVENTION

Field of the Invention

The present invention relates to an information processing system.

Description of the Related Art

There is proposed a method of predicting an abnormality from image data or sensor data on an apparatus using machine learning. In general, for prediction of an abnormality in an apparatus using machine learning, both of data in a normal state and data in an abnormal state are necessary for learning. However, in many cases, abnormal data caused by a failure of an apparatus is not sufficiently collected enough for learning. As a measure against such insufficiency of abnormal data for learning, there is a method of predicting an abnormality by generating a model that learned from only data in the normal state of an apparatus and comparing an inference value obtained by inputting data to the generated model with an actually observed value.

Abnormality prediction using the above method is disclosed in Japanese Patent Laid-Open No. 2018-112852 (hereinafter referred to as PTL1). PTL1 discloses a method of predicting an abnormality by combining a machine learning model that outputs a prediction value for sensor data of an apparatus with a correlation model to which a prediction error of the model is input. In PTL1, only data obtained within a certain period from a reference time out of entire time-series sensor data obtained during the normal state of an apparatus is used as normal data for learning.

SUMMARY OF THE INVENTION

Some apparatus are on standby until receipt of user operation. In such an apparatus, normal data includes a large amount of data obtained during standby. This deteriorates the inference accuracy of input data obtained during operation of the apparatus. Furthermore, even if data obtained during standby of the apparatus is input to perform inference, it is unlikely that an abnormality can be predicted, which results in wastage of processing and communications. Moreover, in the case of an apparatus having a variable operating time according to user operation, there is a possibility that appropriate learning is not performed even if data obtained within a predetermined time is used for learning like PTL1.

An information processing system according to an aspect of the present invention comprises: an obtaining unit configured to obtain time-series data indicating a state of a device; a selection unit configured to select time-series data satisfying a condition indicating that the device is active as input data from among the time-series data obtained by the obtaining unit; and a generation unit configured to generate a learning model based on the input data until the first time selected by the selection unit and teacher data that is data indicating a state of the device at the second time after the first time.

Further features of the present invention will become apparent from the following description of exemplary embodiments with reference to the attached drawings.

BRIEF DESCRIPTION OF THE DRAWINGS

FIGS. 5A and 5B are conceptual diagrams showing a structure of input/output in the case of using a learning model and a learned model;

FIGS. 6A and 6B are diagrams showing data used for input;

FIGS. 8A and 8B are diagrams showing an example of learning data used for learning;

DESCRIPTION OF THE EMBODIMENTS

Figure 1:
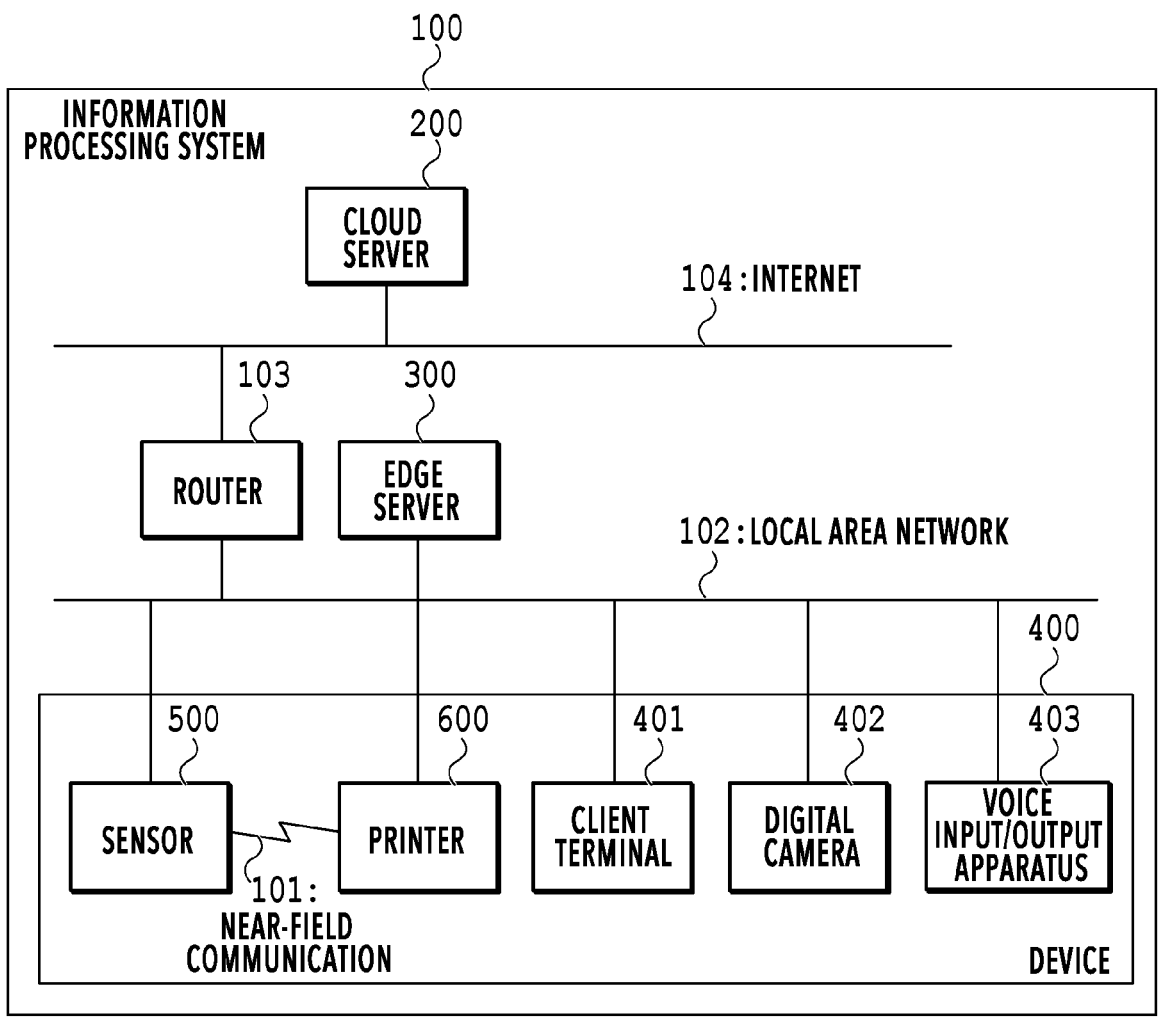
FIG. 1 is a diagram showing a configuration of an information processing system.

Embodiments will be described below with reference to the drawings. The following embodiments do not limit the present invention and not all combinations of the features described in the embodiments are essential. The same reference numeral is assigned to the same feature and the description thereof is omitted.

First Embodiment

In the present embodiment, a description will be mainly given of an example in which a printer is used as a target apparatus of abnormality detection. For example, the printer is a kind of apparatus that is inactive and kept on standby until receipt of user operation. In such an apparatus, normal data includes a large number of data obtained in a standby state in which the apparatus is inactive. In the printer, the apparatus is generally activated to perform processing (i.e., printing processing) based on user operation. At this time, an operating time is variable according to various settings such as the number of pages, resolution, paper type, and print mode. In the embodiment described below, by way of example, a learning model is generated using data obtained while the apparatus is in a normal state and the apparatus is active and performs processing. An abnormality of the apparatus is determined based on data obtained through inference using the generated learning model (called learned model).

(System Configuration)

FIG. 1 is a diagram showing a configuration of an information processing system 100 in the present embodiment. The information processing system 100 includes a cloud server 200, an edge server 300, and devices 400, which are connected via a local area network 102 or the Internet 104. The devices 400 include various apparatus capable of network connection. For example, the devices 400 include a sensor 500, a printer 600, a client terminal 401, a digital camera 402, and a voice input/output apparatus 403. The client terminal 401 includes various terminals such as a personal computer, work station, smartphone, and tablet. However, the devices 400 are not limited to these kinds and may be a household appliance such as a refrigerator, television, or air conditioner, an industrial product, or a manufacturing apparatus. These devices 400 are connected to each other via the local area network 102 and can be connected to the Internet 104 via a router 103 provided in the local area network 102.

FIG. 1 shows the router 103 as an apparatus for connecting the local area network 102 to the Internet 104. However, the router 103 can have the function of a wireless LAN access point that constitutes the local area network 102. In this case, each device 400 can be connected to the access point via the wireless LAN instead of connection to the router 103 via the wired LAN to participate in the local area network 102. For example, the printer 600 can be connected to the client terminal 401 via the wired LAN and connected to the sensor 500 via the wireless LAN.

Each device 400 and the edge server 300 can communicate with the cloud server 200 on the Internet 104 connected via the router 103. The edge server 300 and each device 400 can communicate with each other via the local area network 102. The devices 400 can also communicate with each other via the local area network 102. The sensor 500 and the printer 600 can communicate with each other by a near-field communication 101. As the near-field communication 101, it is considered to use a wireless communication conforming to the Bluetooth™ standard or NFC standard. The configuration shown in FIG. 1 is merely an example and a different configuration may be used. For example, although the example in which the router 103 has the function of an access point has been described, the access point may be configured by an apparatus different from the router 103. The edge server 300 and each device 400 may be connected by a connection means other than the local area network 102. For example, it is possible to use a wireless communication other than the wireless LAN such as LPWA, ZigBee, Bluetooth, or near-field communication, a wired connection such as USB, or an infrared communication. The sensor 500 may be a device with a built-in sensor. For example, the sensor 500 may be configured to store data. The sensor 500 may be provided inside an apparatus such as the printer 600. Each of the cloud server 200, edge server 300, and devices 400 shown in FIG. 1 is a kind of information processing apparatus.

(Server Configuration)

Figure 2:
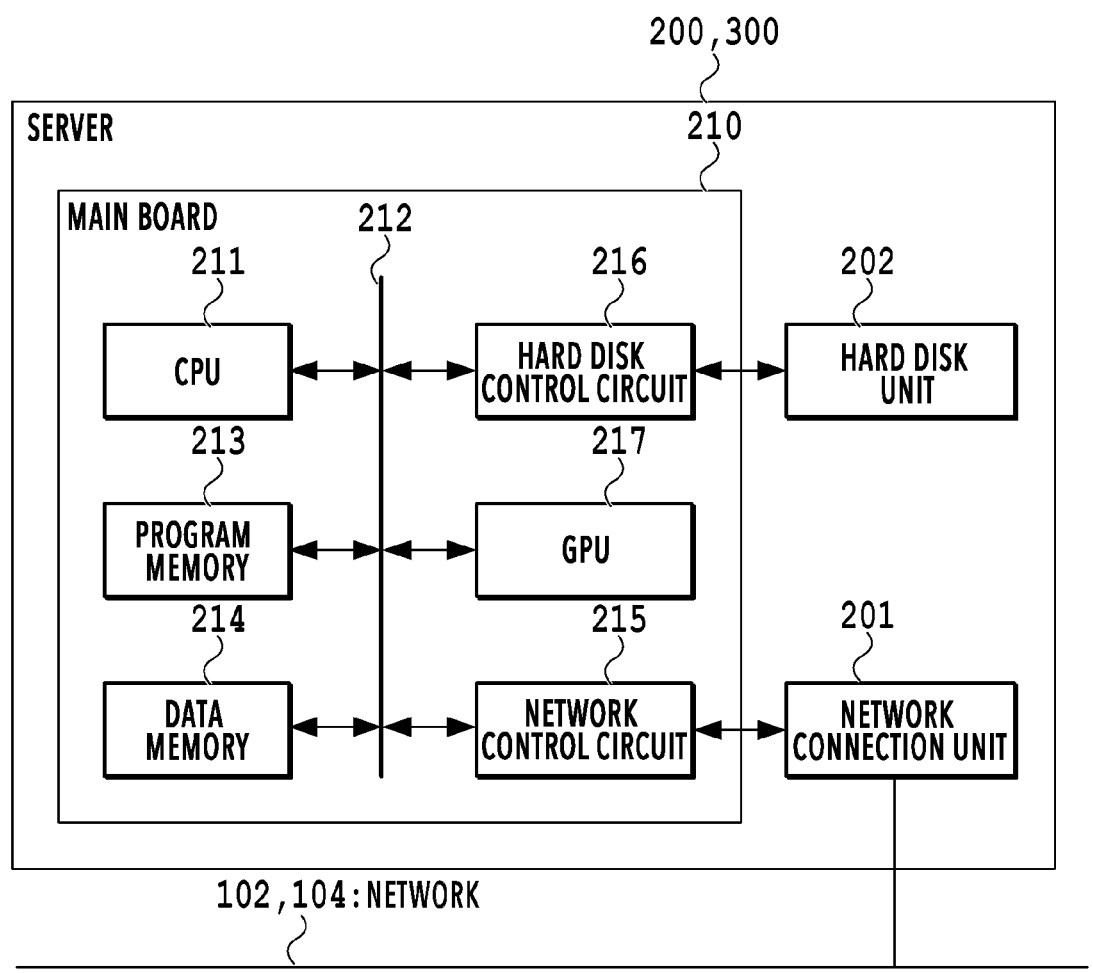
FIG. 2 is a block diagram showing a configuration of a cloud server and an edge server.

FIG. 2 is a block diagram showing a configuration of the cloud server 200 and the edge server 300. The following description is based on the assumption that a common hardware configuration is used for the cloud server 200 and the edge server 300. For convenience of description of the configuration, the cloud server 200 and the edge server 300 are simply referred to as a server 200, 300. The server 200, 300 comprises a main board 210 having control over the entire apparatus, a network connection unit 201, and a hard disk unit 202. The main board 210 comprises a CPU 211, an internal bus 212, a program memory 213, a data memory 214, a network control circuit 215, a hard disk control circuit 216, and a GPU 217.

The CPU 211 in the form of a microprocessor provided on the main board 210 operates according to a control program stored in the program memory 213 connected via the internal bus 212 and the content of the data memory 214. The CPU 211 controls the network connection unit 201 via the network control circuit 215, thereby connecting with a network such as the Internet 104 or the local area network 102 to communicate with a different apparatus. The CPU 211 can read data from and write data to the hard disk unit 202 connected via the hard disk control circuit 216. The hard disk unit 202 stores an operating system loaded and used in the program memory 213, control software of the server 200, 300, and various kinds of data. The main board 210 is equipped with the GPU 217 such that various kinds of calculation processing can be executed by the GPU 217 instead of the CPU 211.

Since the GPU 217 can perform an efficient calculation by parallel processing of a large amount of data, it is effective to use the GPU 217 for processing in the case of performing learning multiple times using a learning model like deep learning. Thus, in the present embodiment, the GPU 217 is used in addition to the CPU 211 for processing by a learning unit 251 (see FIG. 4) to be described below. More specifically, in the case of executing a learning program including a learning model 252, the CPU 211 and the GPU 217 perform a cooperative calculation to perform learning. For the processing of the learning unit 251, only the CPU 211 or the GPU 217 may perform a calculation. Like the learning unit 251, an inference unit 351 (see FIG. 4) to be described later may use the GPU 217. Although the common configuration is used for the cloud server 200 and the edge server 300 in the present embodiment, the configuration is not limited to this. For example, it is possible to use a configuration in which the GPU 217 is mounted on the cloud server 200 but is not mounted on the edge server 300. Alternatively, the cloud server 200 and the edge server 300 may use GPUs 217 different in performance.

(Configuration of Printer)

Figure 3:
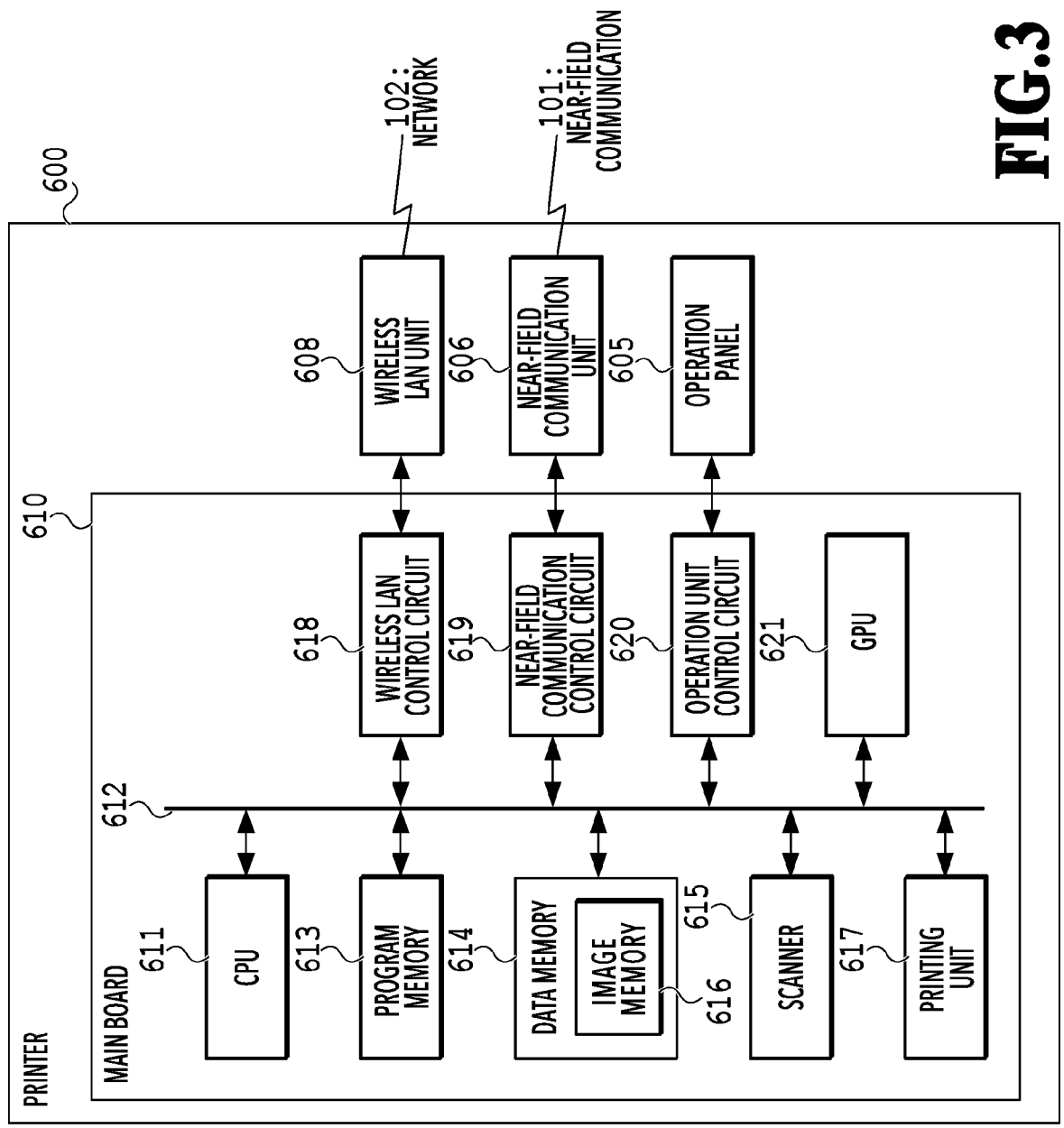
FIG. 3 is a block diagram showing a configuration of a printer.

FIG. 3 is a block diagram showing a configuration of the printer 600. The printer 600 includes a main board 610 having control over the apparatus, an operation panel 605, a near-field communication unit 606, and a wireless LAN unit 608. The main board 610 comprises a CPU 611, a program memory 613, a data memory 614, a scanner 615, a printing unit 617, a wireless LAN control circuit 618, a near-field communication control circuit 619, an operation unit control circuit 620, and a GPU 621. The data memory 614 comprises an image memory 616.

The CPU 611 in the form of a microprocessor provided on the main board 610 operates according to a control program stored in the program memory 613 in the form of a ROM connected via the internal bus 612 and the content of the data memory 614 in the form of a RAM. The CPU 611 controls the scanner 615 to read a document and stores it in the image memory 616 in the data memory 614. The CPU 611 can also control the printing unit 617 to print an image in the image memory 616 in the data memory 614 on a print medium. The CPU 611 performs wireless LAN communication with a different communication terminal apparatus by controlling the wireless LAN unit 608 via the wireless LAN control circuit 618. The CPU 611 can also control the near-field communication unit 606 via the near-field communication control circuit 619 to detect connection with a different near-field communication terminal and transmit data to/receive data from a different near-field communication terminal. The CPU 611 can control the operation unit control circuit 620 to display the state of the printer 600 or a function selection menu on the operation panel 605 and accept operation from a user. The CPU 611 can also perform processing of periodically storing/recording the state of the printer 600 in the program memory 613 or the data memory 614. The operation panel 605 comprises a backlight and the CPU 611 can control the turn-on or turn-off of the backlight via the operation unit control circuit 620.

(Learning and Inference Processing)

Figure 4:
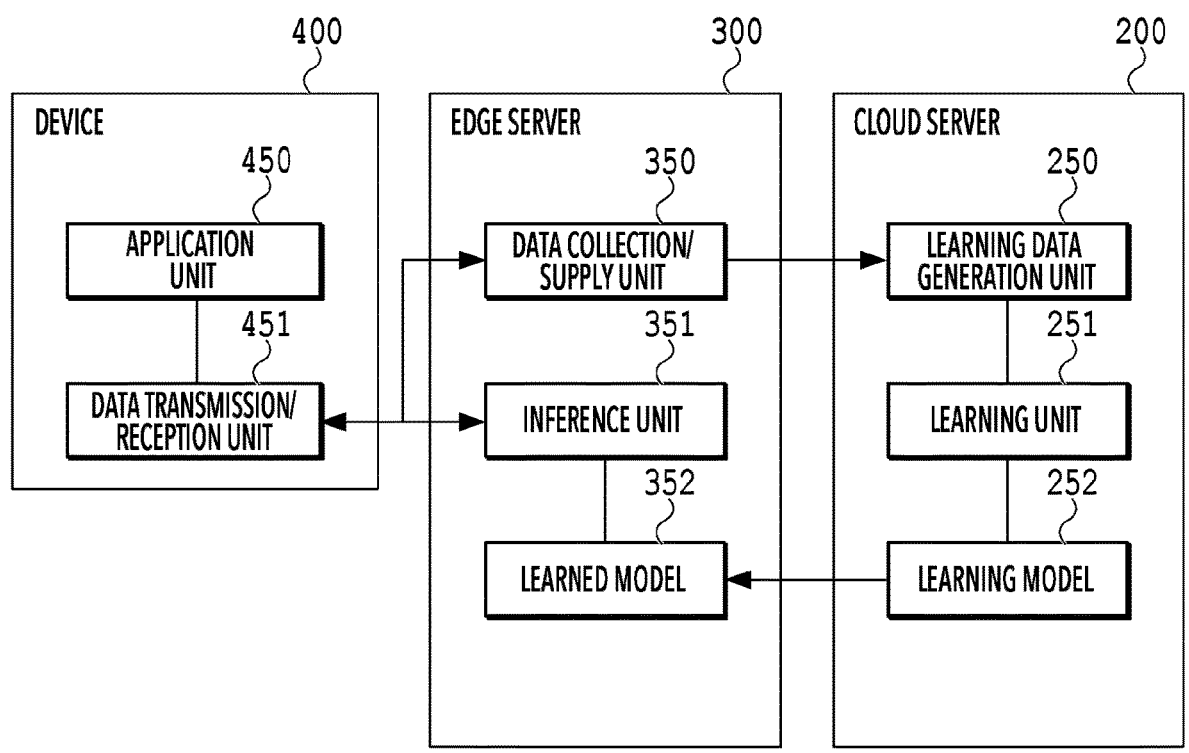
FIG. 4 is a diagram showing a software configuration of the information processing system.

FIG. 4 is a diagram showing a software configuration of the information processing system 100. FIG. 4 mainly shows a software configuration relating to learning and inference processing in the present embodiment and does not show other software modules. For example, FIG. 4 does not show an operating system that runs on each device or server, various kinds of middleware, an application for maintenance, and the like.

The cloud server 200 comprises a learning data generation unit 250, a learning unit 251, and a learning model 252. The learning data generation unit 250 is a module that generates learning data processable by the learning unit 251 from externally received data. The learning data is time-series data X input to the learning unit 251. The learning data generation unit 250 may treat the externally received data as learning data without any change. The learning unit 251 is a program module that causes the learning model 252 to learn from the learning data received from the learning data generation unit 250. That is, the learning model 252 is generated through learning by the learning unit 251. The learning unit 251 may perform processing for tuning a hyperparameter of the learning model 252 to improve the accuracy of the learning model 252. The learning model 252 accumulates learning results such as a parameter and inference error of the learning model performed in the learning unit 251. Here, an example of realizing the learning model 252 as a recurrent neural network (RNN) is described. In this example, time-series data is input to the RNN, thereby generating a learning model that outputs a prediction value at a time after the input time-series data. The learning model 252 subjected to learning by the learning unit 251 is distributed to the edge server 300 as a learned model 352 and managed in the edge server 300. The learned model 352 is used for inference processing performed in the edge server 300.

The edge server 300 comprises a data collection/supply unit 350, an inference unit 351, and a learned model 352. The data collection/supply unit 350 is a module that transmits data received from the device 400 or data collected by the edge server 300 to the cloud server 200 as a data group used for learning. The inference unit 351 is a program module that executes inference using the learned model 352 based on data transmitted from the device 400 and returns the result to the device 400. Data transmitted from the device 400 is data to be input data X of the inference unit 351.

The learned model 352 is used for inference performed in the edge server 300. The learned model 352 is also realized as a neural network like the learning model 252. However, the learned model 352 may be identical to the learning model 252 or may extract and use a part of the learning model 252. The learned model 352 stores the learning model 252 accumulated in the cloud server 200 and distributed. As the learned model 352, the entire learning model 252 may be distributed, or a part of the learning model 252 necessary for inference in the edge server 300 may be extracted and distributed.

The device 400 comprises an application unit 450 and a data transmission/reception unit 451. The application unit 450 is a module that realizes various functions executed by the device 400 and uses a learning/inference mechanism of machine learning. The data transmission/reception unit 451 is a module that requests the edge server 300 to perform learning or inference. At the time of learning, the data transmission/reception unit 451 transmits data used for learning to the data collection/supply unit 350 of the edge server 300 at the request from the application unit 450. At the time of inference, the data transmission/reception unit 451 transmits data used for inference to the edge server 300 at the request from the application unit 450, receives the result, and returns it to the application unit 450.

FIG. 4 shows the example in which the learning model 252 generated through learning in the cloud server 200 is distributed to the edge server 300 as the learned model 352 and the distributed learned model 352 is used for inference by the edge server 300. However, which of the cloud server 200, the edge server 300, and the devices 400 executes learning or inference may be determined according to the distribution of hardware resources, the amount of calculation or data communication, or the like. Alternatively, it may be dynamically changed according to an increase or decrease in distribution of resources or amount of calculation or data communication. In a case where learning and inference are performed by different subjects, the inference side can be executed more rapidly by using a logic dedicated for inference or reducing the capacity of the learned model 352.

FIGS. 5A and 5B are conceptual diagrams showing a structure of input/output in the case of using the learning model 252 and the learned model 352. FIG. 5A shows the relationship between the learning model 252 and input/output data in learning. The learning data used for learning includes input data X (501) and teacher data T (502). The input data X (501) is data in the input layer of the learning model 252. The input data X in the present embodiment is time-series data. The input data X will be described later in detail. In a case where the input data X is input to the learning model 252, the learning model 252 predicts data at a second time after the input data X that is time-series data and the result of prediction is output as output data Y (503). At the time of learning, teacher data T (502) is provided as data actually measured at the second time after the input data X. Thus, a displacement amount L (505) (also referred to as prediction error) from the correct answer of the prediction result is obtained by providing a loss function 504 with the output data Y and the teacher data T.

At the time of learning, RNN parameters and the like in the learning model 252 are updated such that the displacement amount L (505) is small with respect to a large amount of learning data. In the present embodiment, the RNN is used as a machine learning algorithm. However, another recurrent neural network may be used. For example, a long short-term memory (LSTM) or a bidirectional RNN may be used. Further, as a network structure, a combination of several network structures may be used. For example, a convolutional neural network (CNN) may be combined with a recurrent neural network such as RNN or LSTM, or an autoencoder.

FIG. 5B shows the relationship between the learned model 352 and input/output data in inference. Input data X (551) is data in the input layer of the learned model 352. The input data X (551) in inference is also time-series data. In a case where the input data X is input to the learned model 352, the learned model 352 predicts data at a time (corresponding to the second time) after the input data X that is time-series data and the result of prediction is output as output data Y (553). At the time of inference, the output data Y is used as an inference result. Although the learned model 352 in inference has been described as one having the same network structure as the learning model 252 in learning, it is also possible to extract only a part necessary for inference as the learned model 352. This can reduce the amount of data of the learned model 352 and the time of inference processing.

(Abnormality Prediction Processing)

Next, abnormality prediction processing of the present embodiment will be described. The abnormality prediction processing of the present embodiment includes data selection processing of excluding data in a specific apparatus state of the device 400 from input data in the learning/inference step. For example, the data selection processing is performed to exclude data in a rest state of the device 400 from input in the learning/inference step.

In the present embodiment, a learning model that learned from data in the normal state of the apparatus is generated. As described above, the generated learning model is configured to, in a case where the input data X that is time-series data is input, output the output data Y at the second time after the input data X. At the stage of inference, in a case where an apparatus that performs abnormality prediction (the edge server 300 in this example) inputs input data X to the generated learning model (learned model), output data Y at a third time (corresponding to the second time) after the input data X is obtained. On the other hand, the edge server 300 also obtains an actual value corresponding to the third time. The actual value actually observed is compared with the output data Y (inference value) output from the learning model, whereby an abnormality is predicted. This learned model learned from only data in the normal state of the device 400. Thus, at the time of inference, in a case where data in the normal state of the device 400 is input to the learned model, a prediction error between the inference value and the actually observed value is small. That is, the inference functions accurately. In contrast, in a case where data in an abnormal state of the device 400 is input to the learned model, a prediction error between the inference value and the actually observed value is large. That is, in a case where a difference (prediction error) between the inference value and the actually observed value is larger than a predetermined threshold, it can be determined that the device 400 is abnormal or has a possibility of being abnormal. As described above, in the present embodiment, the prediction error is compared with an abnormality determination threshold and it is determined whether the apparatus is normal or abnormal depending on their magnitude relationship. In this manner, it can be inductively determined whether data input to the learned model indicates an abnormality of the apparatus.

In the present embodiment, processing of detailed selection of input data input at the time of learning is performed. In other words, instead of merely treating data in the normal state as input data, data in the normal state obtained while the apparatus is active is selected as input data. If data is selected only from the viewpoint of data in the normal state, the data may include a large amount of data in a specific state. For example, in the case of an apparatus (device) characterized in that the apparatus is on standby and kept inactive until user operation like the printer 600, normal data includes a large amount of data in the standby state obtained while the apparatus is inactive. This deteriorates the inference accuracy of data input during operation. Thus, in the present embodiment, processing is performed to select data in the normal state obtained while the apparatus is in an active state (for example, a state other than the standby state or rest state) as input data at the stage of learning. Further, at the stage of inference, processing is performed to select data obtained while the apparatus is in an active state (for example, a state other than the standby state or rest state) as input data. That is, in the present embodiment, data selection processing is performed to exclude data in a standby state or a rest state of the apparatus from input data in the learning step and the inference step.

FIGS. 6A and 6B are diagrams showing data used for input. FIG. 6A shows an example of input data X. As shown in FIG. 6A, the input data X is time-series data in which each column consists of data for each parameter and each row consists of data at each time count. The input data X may store different kinds of sensor data for respective parameters. For example, the input data X may store corresponding data such as a temperature for parameter 1 and a pressure for parameter 2. FIG. 6B shows an example of learning data of input data X and teacher data T used for learning in the case of generating a learning model that predicts data corresponding to one count from data corresponding to preceding three counts. A time length of input data and a time length to be predicted may be appropriately changed according to an applied system. Since they are also regarded as hyperparameters of the learning model, the learning unit 251 can select the time length of input data and the time length to be predicted in order to improve the accuracy of the learning model 252. Although the time-series data includes several types of parameters for example, it may include a single type of parameter. One count may be any predetermined unit of time and is appropriately determined according to sensor data.

Figure 7:
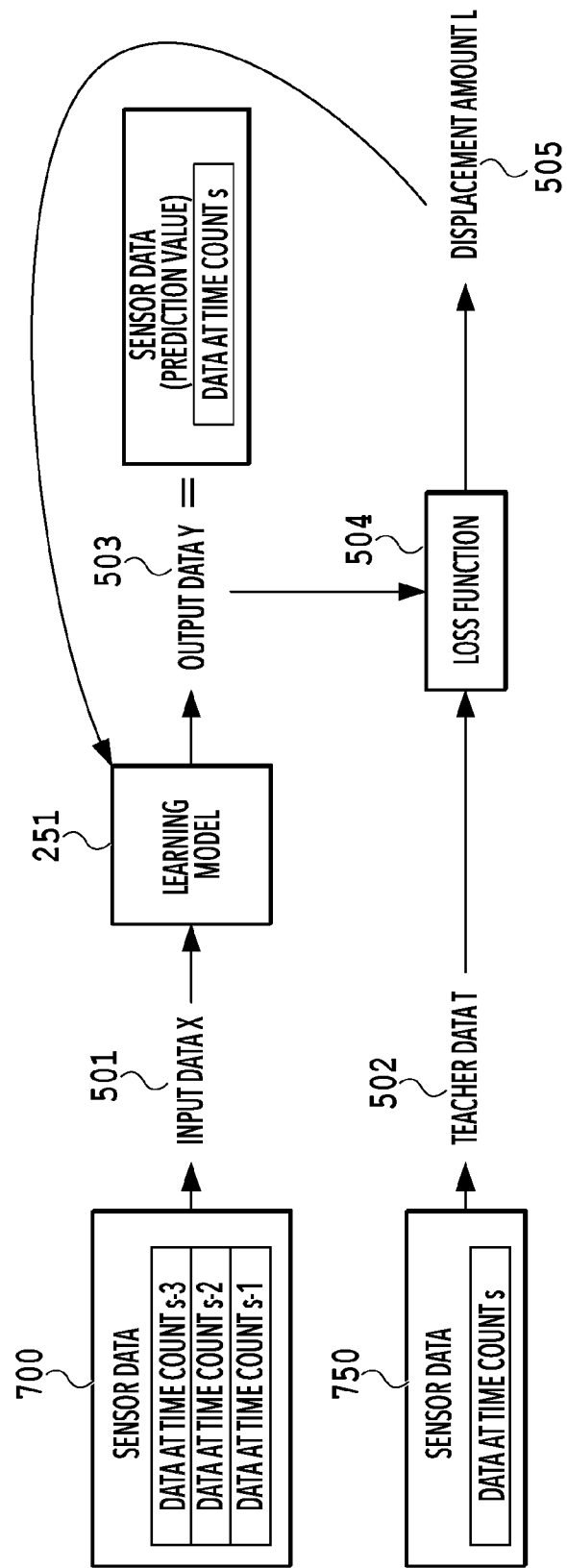
FIG. 7 is a diagram showing a structure of input/output of a learning model in learning.

FIG. 7 is a diagram showing a structure of input/output of the learning model 252 in learning. The learning model 252 will be hereinafter described as a model that predicts data corresponding to one count from data corresponding to preceding three counts. Sensor data 700 is used as the input data X and sensor data 750 is used as the teacher data T. That is, both of the input data X and the teacher data T are data on actual values obtained through actual measurements. In this example, it is assumed that the sensor data 700 is a set of data corresponding to preceding three counts of data included in the sensor data 750. In the learning model 252, learning is performed so as to minimize a displacement amount L between the teacher data T 750 and the output in the case of inputting the sensor data 700 to the learning model 252, and the learning model 252 is updated (generated). That is, output data Y (503), which is a prediction value at time count t=s obtained by inputting sensor data 700 at time counts t=s−3, s−2, s−1 to the learning model 252, and sensor data 750, which is an actual value at time count t=s, are obtained. The output data Y (503), which is the prediction value at time count t=s, and the sensor data 750, which is the actual value at time count t=s, are input to a loss function 504. A prediction error obtained from the loss function 504 at this time is the displacement amount L (505).

FIGS. 8A and 8B are diagrams showing an example of learning data used for learning. FIG. 8A shows a pair of learning data, namely a pair of input data X and teacher data T. FIG. 8B is a diagram showing an abnormality determination threshold used as an index of abnormality prediction at the time of inference. A learning data set 821 includes a plurality of pairs of learning data as shown in FIG. 8A. In this example, the learning data set 821 includes training data 822 used for updating parameters of the learning model and validation data 823 for evaluating the prediction accuracy of the learning model 252, which is not used for updating parameters of the learning model. The training data 822 and the validation data 823 are of the same type but are different in purpose (whether they are used for updating parameters of the learning model).

In the present embodiment, the validation data 823 is used to determine an abnormality determination threshold 830. More specifically, the displacement amount L (505) corresponding to a prediction error between the output data Y obtained by inputting the input data X of the validation data 823 to the learning model 252 and the teacher data T corresponding to the input data X is obtained as prediction accuracy for each validation data 823. The displacement amount L505 obtained using the validation data 823 is not used for updating parameters of the learning model. In the present embodiment, the average value of displacement amounts L505 obtained using the validation data 823 is determined as the abnormality determination threshold 830. A method of preparing the validation data may be any of a cross validation method, a hold-out method, and a leave-one-out method, or a different method. Although the abnormality determination threshold 830 is the average value of validation data (that is, an average error) in the present embodiment, a different index may be used. For example, it is possible to use the maximum value, minimum value, or other statics of the displacement amounts L of the validation data.

Figure 9:
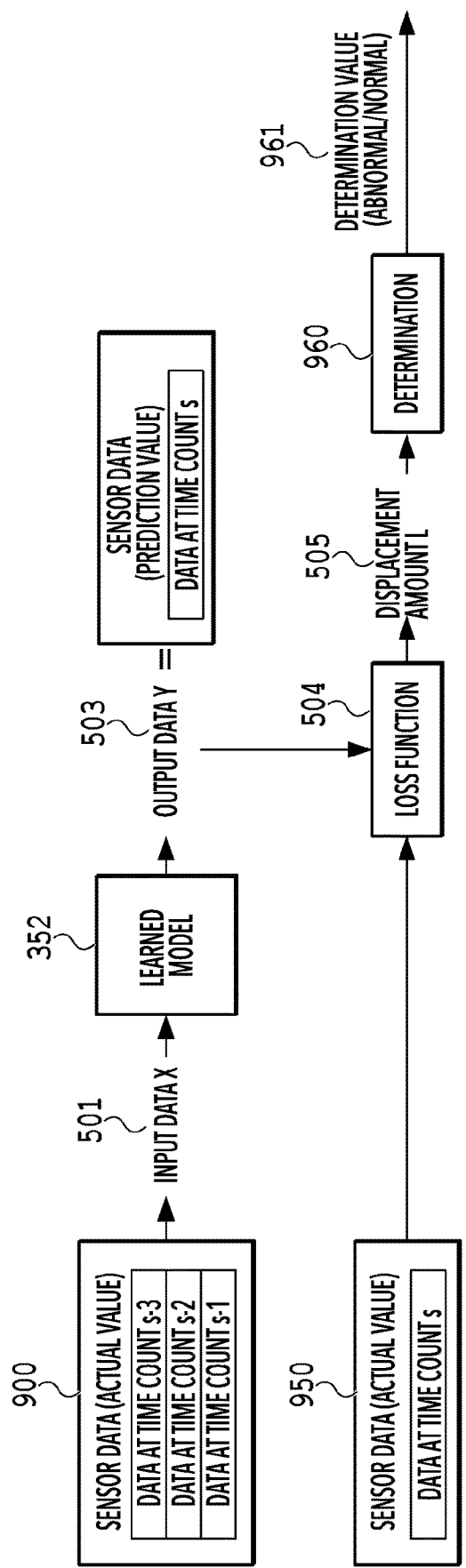
FIG. 9 is a diagram showing a structure of determining an abnormal state.

FIG. 9 is a diagram showing input/output of the learned model 352 and a structure for determining an abnormal state based on output data of the learned model 352 at the time of inference. Sensor data 900 similar to that used for learning is used as the input data X. More specifically, data corresponding to time counts t=s−3, s−2, s−1 becomes the input data X. As described above, the learned model 352 is a model generated to predict data corresponding to one count from data corresponding to preceding three counts. Thus, the output data Y of the learned model 352 is an inference value (prediction value) of data at time count t=s. The displacement amount L (505) required for inference is a prediction error obtained by inputting the output data Y (503), which is the inference value at time count t=s, and the sensor data 950, which is the actual value at time count t=s, to the loss function 504. The loss function 504 may be the same loss function as that used for learning. Determination processing 960 is processing of determining from the displacement amount L (505) whether the apparatus is abnormal. A flow of inference processing including the determination processing 960 will be described later. A determination value 961 is an output value of the determination processing 960. In this manner, whether the apparatus is abnormal can be determined using the output data at the time of inference.

Figure 10:
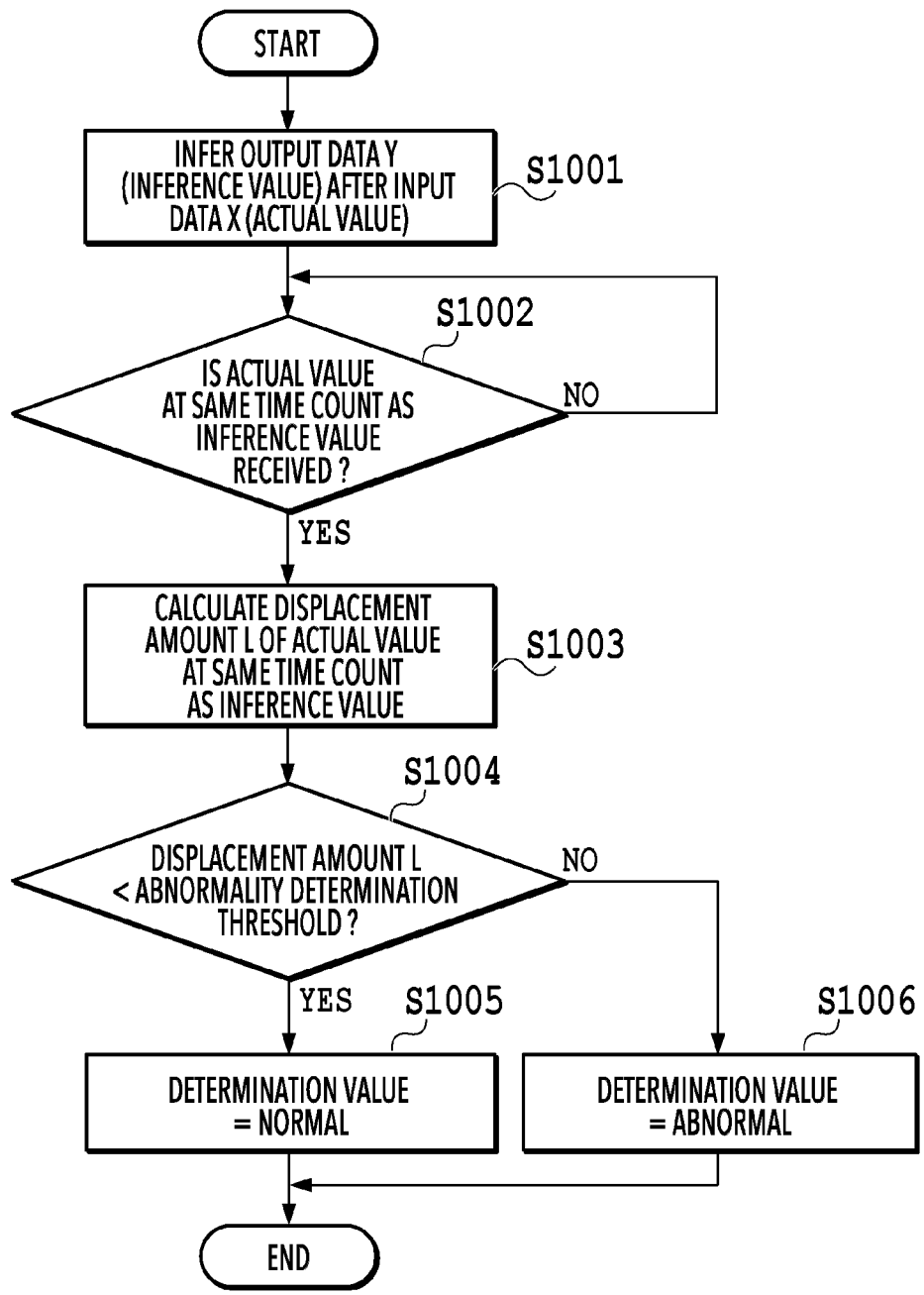
FIG. 10 is a flowchart of inference processing including determination in inference.
Figure 11:
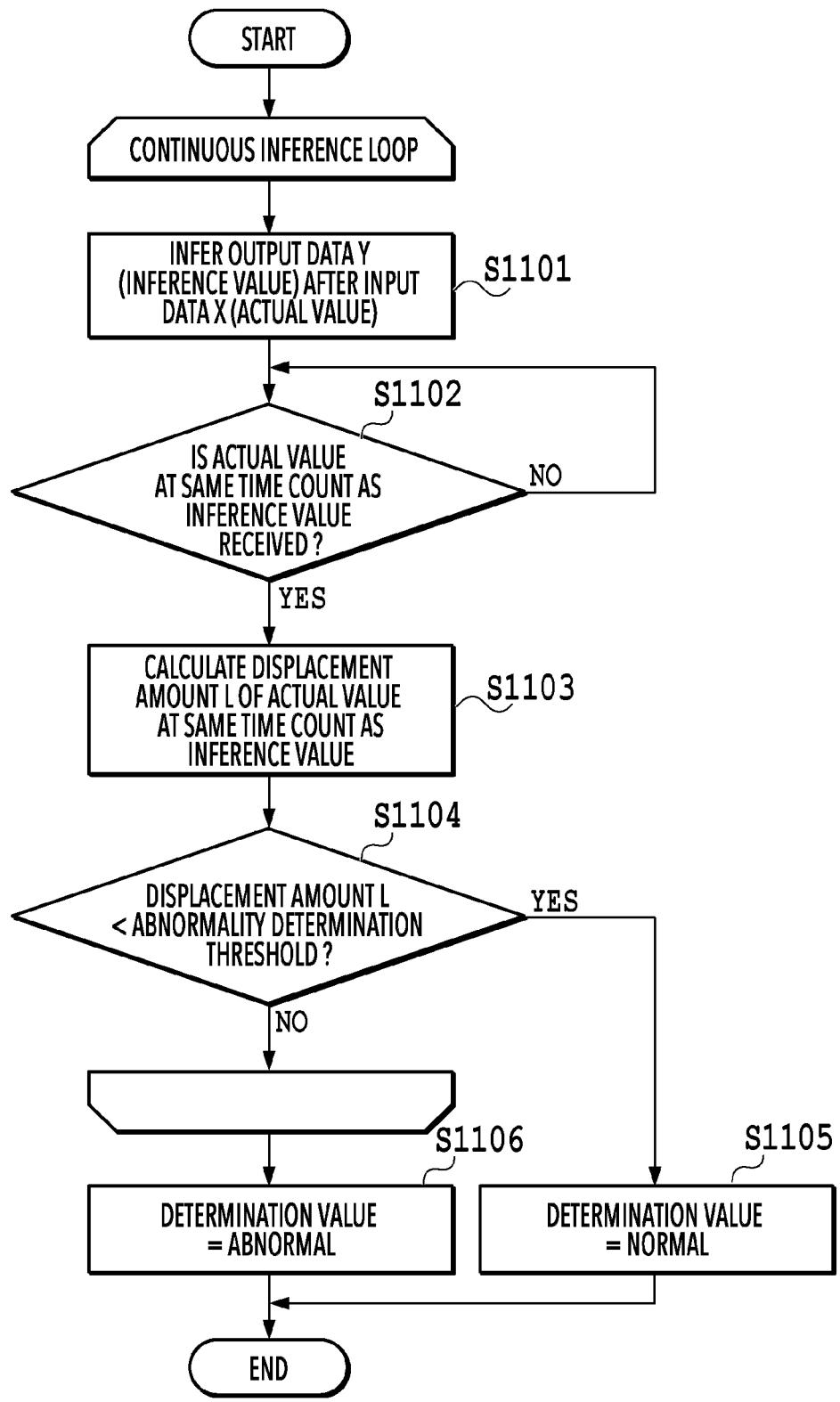
FIG. 11 is a flowchart of inference processing including determination in inference.

FIG. 10 and FIG. 11 are flowcharts showing processing of the inference processing and the determination processing 960. The inference processing and the determination processing 960 may be performed by any of the processing shown in FIG. 10 and FIG. 11. In this example, it is assumed that the processing shown in the FIG. 10 and FIG. 11 is performed by the inference unit 351 of the edge server 300. That is, the CPU 211 and the GPU 217 of the edge server 300 perform the inference processing and the determination processing using the learned model 352 stored in the data memory 214 according to the program stored in the program memory 213. In the description of processing, sign "S" indicates a step in the flowchart (the same applies hereinafter).

FIG. 10 is a flowchart in the case of determining whether the apparatus is normal or abnormal based on a single inference result. In S1001, the inference unit 351 infers output data Y (inference value) at a time after the input data X (actual value). That is, the inference unit 351 inputs the input data X to the learned model 352 and obtains the output data Y (inference value) corresponding to the input data X. After that, in S1002, the inference unit 351 determines whether an actual value at the same time count as the inference value obtained in S1001 has been received. In this example, the inference unit 351 determines whether an actual value at the same time count as the inference value has been received from the data transmission/reception unit 451 of the device 400. If an actual value at the same time count as the inference value has been received, the inference unit 351 proceeds to S1003. If not, the inference unit 351 repeats the determination in S1002 and is on standby for processing until receipt of an actual value. In the case of performing abnormality prediction processing in the device 400, it is determined in S1002 whether an actual value has been obtained in the apparatus.

In S1003, the inference unit 351 inputs the inference value and the actual value at the same time count as the inference value to the loss function 504 and calculates a displacement amount L. In S1004, the inference unit 351 makes a magnitude comparison between the displacement amount L calculated in S1003 and the abnormality determination threshold. If the abnormality determination threshold is larger, the inference unit 351 proceeds to S1005 and sets the determination value as normal. If not, the inference unit 351 proceeds to S1006 and sets the determination value as abnormal. After that, the processing is finished.

FIG. 11 is a flowchart in the case of determining whether the apparatus is normal or abnormal based on a plurality of continuous inference results. The processing from S1101 to S1104 is the same as the processing from S1001 to S1004 of FIG. 10. In the example of FIG. 11, the processing from S1101 to S1104 continuously loops multiple times. At this time, the number of continuous loops may be arbitrarily determined. In FIG. 11, if the displacement amount L never falls below the abnormality determination threshold during the continuous execution of the inference processing, the determination value is set as abnormal in S1106. If not, the determination value is set as normal in S1105. After that, the processing is finished. The processing of FIG. 11 determines an abnormality if all the inference results are equal to or larger than the abnormality determination threshold.

Figure 12:
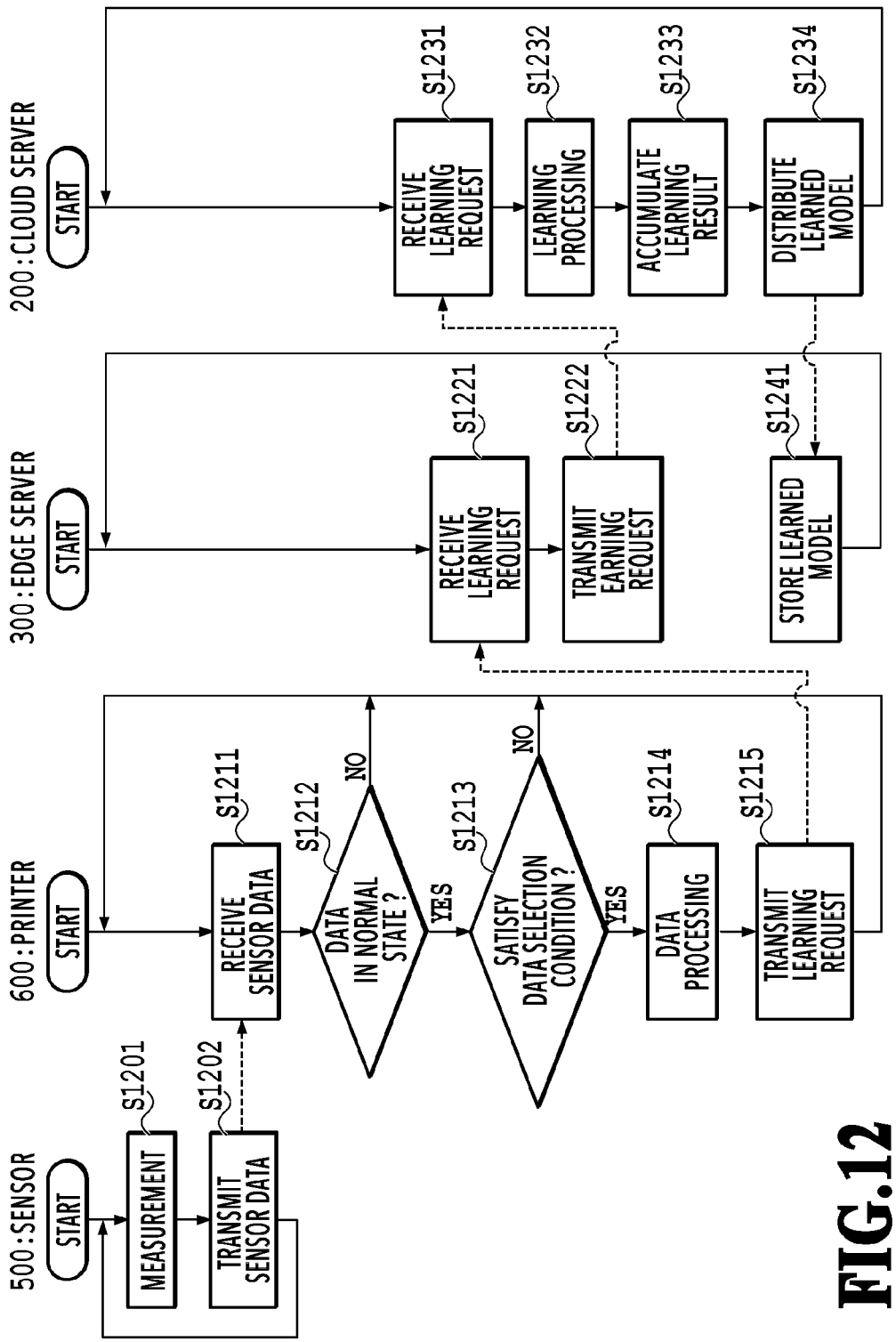
FIG. 12 is a sequence diagram showing operation of the entire information processing system in learning.

FIG. 12 is a sequential diagram showing operation of the entire information processing system 100 at the time of learning. Processing of the printer 600 in FIG. 12 is executed by at least one of the CPU 611 and the GPU 621 according to the program stored in the program memory 613. Processing of each of the edge server 300 and the cloud server 200 in FIG. 12 is executed by at least one of the CPU 211 and the GPU 217 according to the program stored in the program memory 213. The same applies to processing at the time of inference in FIG. 13 to be described later.

FIG. 12 shows the flow in which the printer 600 receives sensor data from the sensor 500, learning is performed in the cloud server 200 using the sensor data, and the edge server 300 stores the result of learning as the learned model. It is assumed that the sensor 500 is a sensor mounted on the printer 600 or a sensor that monitors the behavior of the printer 600. First, the sensor 500 measures data in S1201. In S1202, the sensor 500 transmits sensor data measured in S1201 to the printer 600. In this manner, the sensor 500 performs sequential measurement and transmission of data.

The printer 600 receives sensor data in S1211. The printer 600 may proceed to the next processing after accumulating sensor data received predetermined times (or within a predetermined period) in S1211. In S1212, the printer 600 determines whether the received sensor data is data in the normal state. There are various methods for determining whether the data is data in the normal state. For example, the first method of determining whether the data is data in the normal state is to refer to a log stored in the printer 600. It is conformed whether an error has occurred in the sensor 500 or the printer 600 or there was an abnormality in a printing result at a date and time of measurement of the sensor data. If no error or abnormality has occurred, the data can be determined as data in the normal state. The second method is to use abnormality measurement results of a plurality of sensors 500. For example, the printer 600 is notified of abnormality occurrence in a case where an abnormality is detected by sensors such as a fire alarm, an electric leakage detector, or a seismic detector. Whether an abnormality has occurred at a date and time of measurement of the sensor data can be determined by comparing an abnormality occurrence time stored in the printer 600 with the date and time of measurement of the sensor data. The third method is to manually attach a label indicating data in the normal state or data in the abnormal state to previously measured sensor data.

The processing proceeds to S1213 if the data is data in the normal state and returns to S1211 if the data is not data in the normal state. In other words, if the data is not data in the normal state, the data is not suitable for learning in the present embodiment and is thus not used for the subsequent processing. In the processing at the learning stage, previously obtained data is basically used for learning. Thus, it is determined in S1212 whether the sensor data is data in the normal state. In contrast, in the inference processing described later, currently obtained data is basically used for processing of determining a current or future abnormality. Thus, in the inference processing described later, determination corresponding to S1212 is not performed.

In S1213, the printer 600 determines whether the sensor data satisfies a data selection condition. If the data satisfies the data selection condition, the processing proceeds to S1214. If not, the processing returns to S1211. In this example, the data selection condition is that the apparatus is active. Whether the apparatus is active can be determined by determining, for example, whether the apparatus is in a standby state such as a rest state. By way of example, in S1213, it is determined whether the apparatus state of the printer 600 was the rest state at the time of data measurement. If the apparatus state is the rest state, the data does not satisfy the data selection condition and is thus not used for learning. This is because if the apparatus state is the rest state, the data includes a large amount of data in the standby state in which the apparatus is inactive as described above and this may interfere with improvement of learning accuracy. In this example, although the learning processing is performed only in a case where the data is not data in the rest state, a plurality of apparatus states may be set as data selection conditions. For example, the learning processing may be performed in a case where the apparatus state is other than initialization processing or the rest state.

In S1214, the printer 600 performs data processing. Here, processing is performed to convert the received sensor data into a format of input data X and teacher data T. In S1214, dimensionality reduction processing such as standardization, normalization, and principal component analysis, and other processing for feature amount calculation can also be performed as necessary. In this example, although S1214 is performed by the printer 600, processing corresponding to S1214 may be performed in the edge server 300 or the cloud server 200 which receives data before processing from the printer 600. In S1215, the printer 600 transmits a learning request to the edge server 300 together with the data processed in S1214.

In S1221, the edge server 300 receives the learning request transmitted from the printer 600. In S1222, the edge server 300 transmits the learning request to the cloud server 200.

In S1231, the cloud server 200 receives the learning request transmitted from the edge server 300. In S1232, the cloud server 200 starts learning processing. In S1233, the cloud server 200 accumulates learning results of learning in S1232. The learning results include the abnormality determination threshold 830 as well as the generated learned model 352. In S1226, the cloud server 200 distributes the learned model 352 and the abnormality determination threshold 830 to the edge server 300. In S1241, the edge server 300 stores the learned model 352 and abnormality determination threshold 830 received from the cloud server 200.

In this example, in the case of making the learning request, the learning request is transmitted from the printer 600 to the cloud server 200 via the edge server 300. However, the learning request is not limited to this and may be transmitted directly from the printer 600 to the cloud server 200. Alternatively, all of the processing may be performed by the printer 600 without providing the edge server 300 and the cloud server 200.

In this example, the learned model 352 is distributed to the edge server 300 each time the cloud server 200 performs learning. However, in a case where the cloud server 200 performs a large volume of learning, it is not necessary to distribute the model each time. The cloud server 200 may periodically distribute the learned model 352 to the edge server 300 at a predetermined timing. Alternatively, the edge server 300 may transmit a distribution request as necessary such that the cloud server 200 distributes the model to the edge server 300 in response to the distribution request. Further, although the description has been given of the distribution of the learned model 352 that learned from only the sensor data of the printer 600, the learned model 352 used for inference of the printer 600 does not necessarily learn from the learning data of the printer 600. For example, a learned model generated by learning from data of a printer different from the printer 600 may be distributed and used by the printer 600 for inference. Alternatively, a learned model that learned from data of a different printer may additionally learn from data of the printer 600 to generate a learned model.

The selection processing of input data and the data processing may be performed by the cloud server 200 performing learning and the edge server 300 performing inference, respectively.

Figure 13:
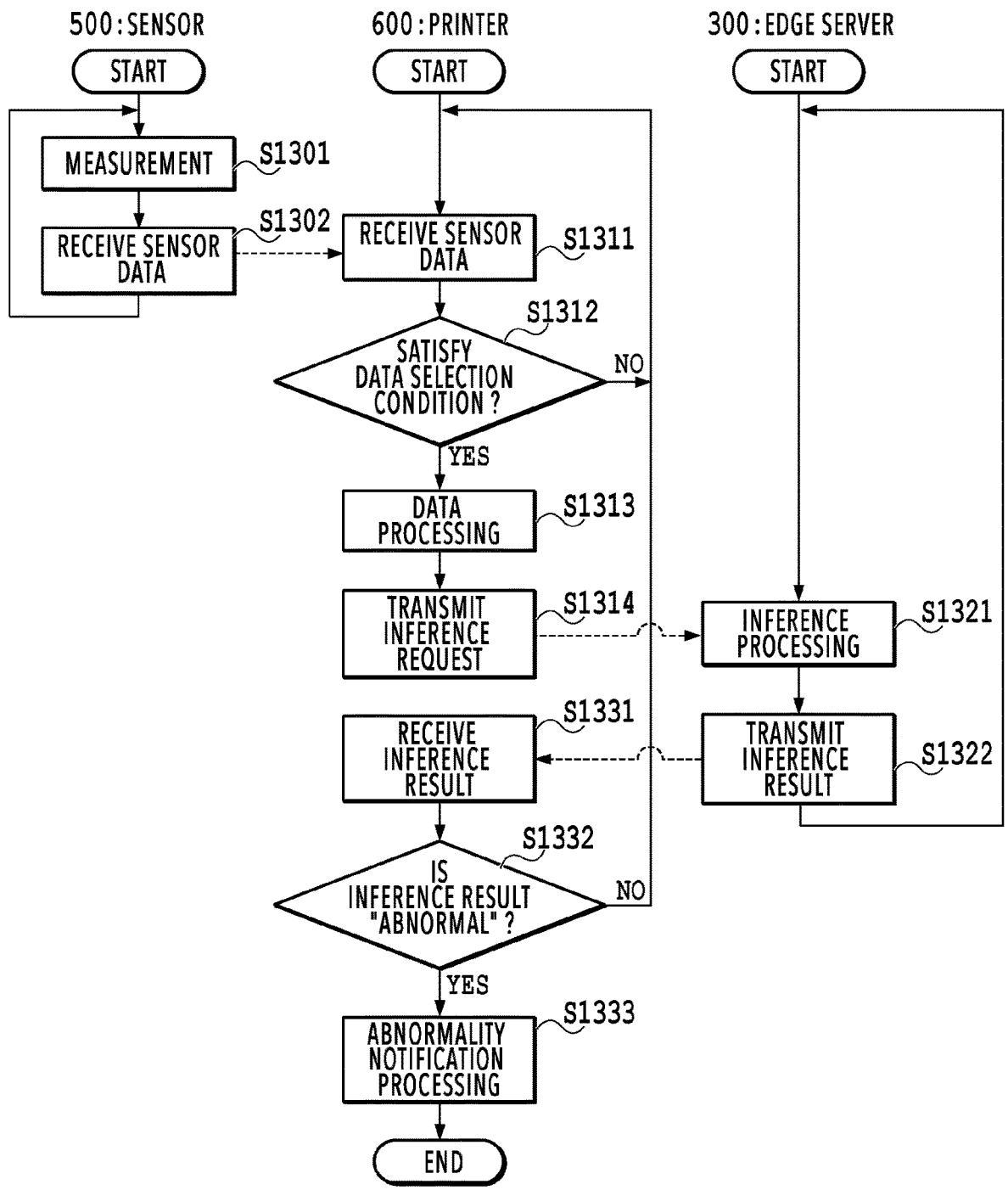
FIG. 13 is a sequence diagram showing operation of the entire information processing system in inference.

FIG. 13 is a sequence diagram showing operation of the information processing system 100 at the time of inference. FIG. 13 shows the flow in which the printer 600 receives sensor data from the sensor 500, the edge server 300 performs inference using the sensor data transmitted from the printer 600, and the printer 600 predicts an abnormality of the apparatus based on the inference result. Since the processing of S1301, S1302, and S1311 are the same as the processing of S1201, S1202, and S1211 in FIG. 12, the description thereof is omitted. Similarly, since the data selection condition in S1312 and the data processing in S1313 are the same as those in S1213 and S1214 in FIG. 12, the description thereof is omitted.

After the completion of processing of sensor data by the processing of S1313, in S1314, the printer 600 makes an inference processing request to the edge server 300. The inference processing request includes sensor data processed in S1313. Here, an actual value of sensor data at the same time count as an inference value of the sensor data necessary for calculating the displacement amount L in S1003 of FIG. 10 or S1103 of FIG. 11 may be transmitted in S1314 in which the inference processing request is made, or may be transmitted to the edge server 300 after S1314.

In S1321, the edge server 300 performs inference using sensor data included in the inference processing request received from the printer 600. The inference processing in S1321 corresponds to the processing shown in FIG. 10 or FIG. 11. As a result of the inference processing in S1321, the determination value is set at a value indicating whether the apparatus is normal or abnormal. In S1322, the edge server 300 transmits the inference result to the printer 600. The determination value may be set at any value based on the displacement amount and the printer 600 receiving the determination value may determine whether the apparatus is normal or abnormal.

In S1331, the printer 600 receives the inference result from the edge server 300. In S1332, the edge server 300 determines whether the inference result received in S1331 is abnormal. If the result is not abnormal, the printer 600 repeats the processing from S1311 onward. If the result is abnormal, the printer 600 performs processing of notifying that an abnormality of the apparatus is predicted in S1333.

Figure 14:
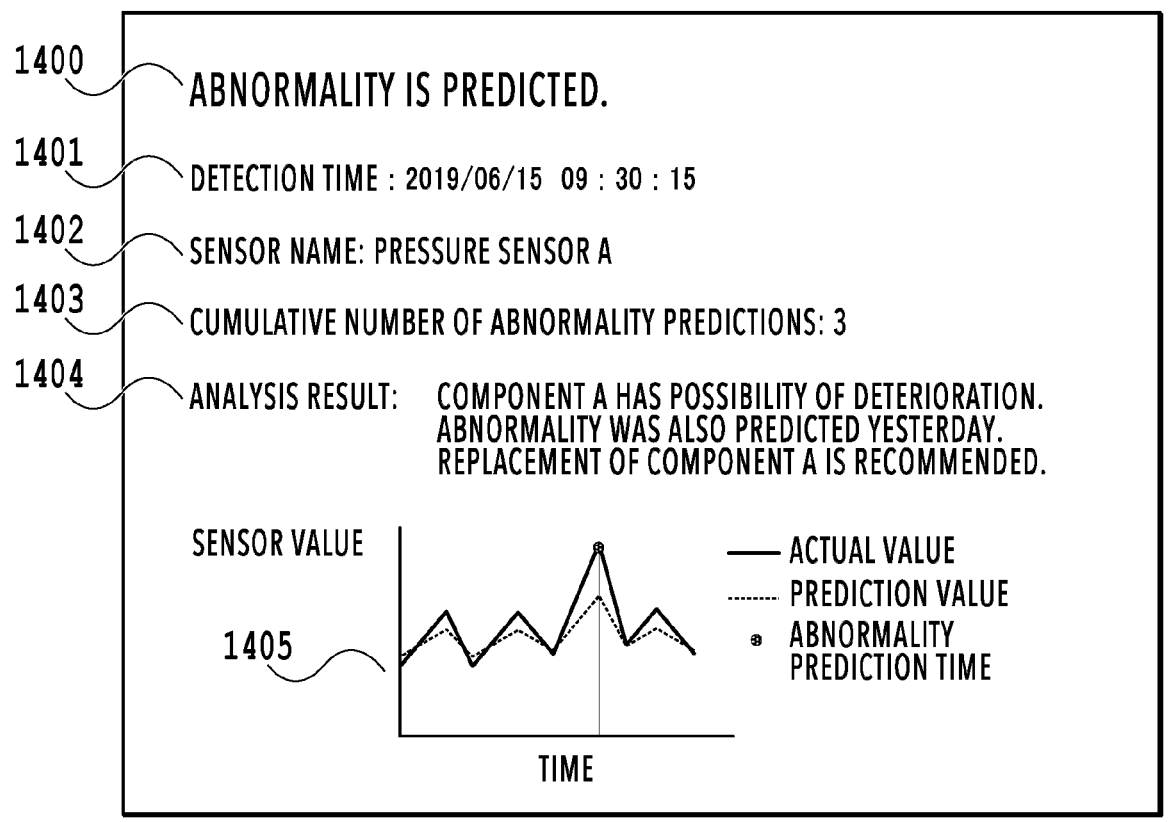
FIG. 14 is a diagram showing an example of a notification of abnormality determination.

FIG. 14 is an example of a display of the contents of the notification in S1333. At the time of abnormality notification, the printer 600 can display various kinds of information on the operation panel 605. In the example of FIG. 14, the printer 600 displays the following information: a text 1400 indicating that an abnormality is predicted; a data and time 1401 of inference execution; a sensor name 1402; the cumulative number 1403 of times that the inference result is abnormal; an analysis result 1404; and the progression 1405 of sensor values until prediction of the abnormality. The same contents can be notified by not only the printer 600 but also the client terminal 401. The display of the notification contents is not limited to this example and any contents may be notified.

As described above, according to the present embodiment, an increase in amount of data in a specific state unsuitable for learning can be prevented at the time of learning in machine learning processing for abnormality prediction. That is, in the present embodiment, learning is performed using normal data obtained while the apparatus is active. The inference thus functions accurately. Furthermore, also at the time of inference, since inference is performed using the data obtained while the apparatus is active, the inference is performed with high accuracy. Moreover, since input data is selected at the time of learning and inference, the processing time and the number of times of processing in learning and inference can be reduced.

Second Embodiment

In the first embodiment, data selection processing of excluding data in a specific apparatus state from input in the learning step and the inference step is performed for abnormality prediction. In the second embodiment, selection processing is performed to select data to be excluded from input in the learning step and the inference step based on a displacement of sensor data.

For example, a displacement of sensor data means a change of the state of the apparatus such as a temperature, humidity, pressure, and ink concentration. The displacement of sensor data is assumed to be caused by various factors such as a change of the environmental condition, a change over time, and activation by user operation. In other words, in a case where sensor data is not displaced, it is assumed that the apparatus is in the standby state or rest state.

Therefore, in the present embodiment, in a case where sensor data is displaced, the sensor data is selected as input in the learning step and the inference step. This enables determination whether the apparatus is abnormal in a case where the state of the apparatus is considered to change. In addition, according to the present embodiment, it is possible to reduce the loads on the printer 600, the edge server 300, and the cloud server 200 relating to the learning processing and inference processing. Since the flowchart processing of the entire information processing system 100 and the basic input/output structure at the time of learning and inference are the same as those in the first embodiment, the description thereof is omitted.

Figure 15:
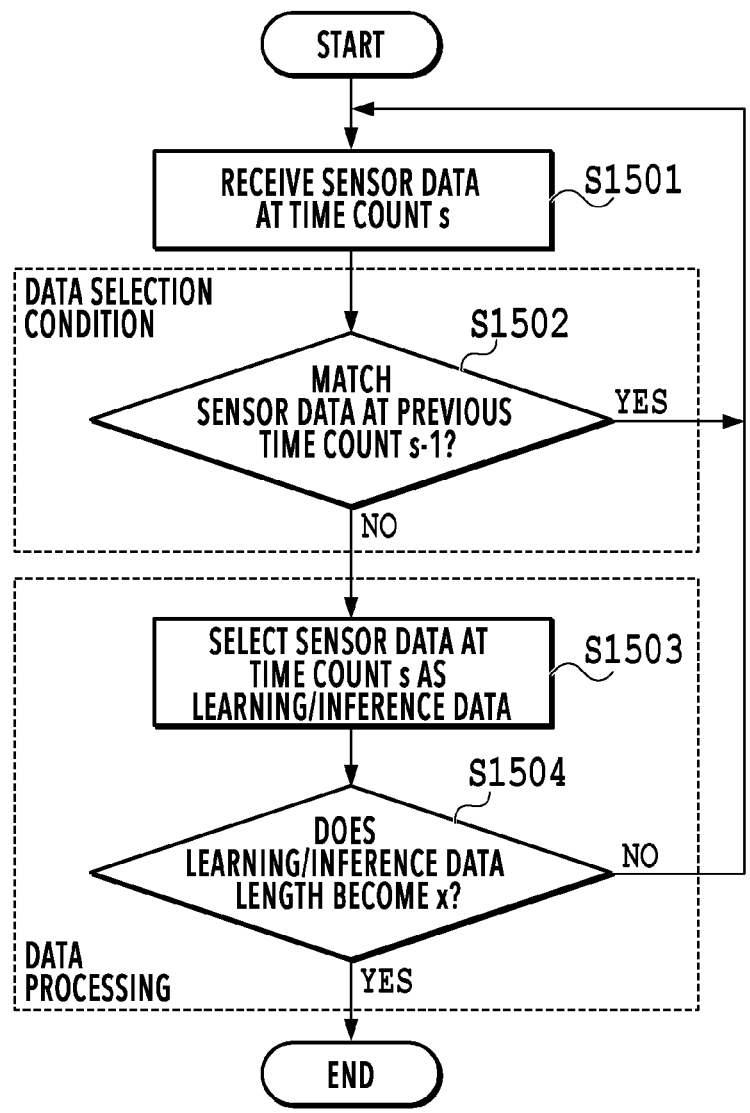
FIG. 15 is a flowchart showing data selection processing and data processing.

FIG. 15 is a flowchart specifically showing the contents of the data selection condition determination processing (S1213, S1312) and the data processing (S1214, S1313) in the printer 600 in the second embodiment.

In S1501, the printer 600 receives sensor data at time count s. In S1502, the printer 600 compares values between the sensor data and sensor data at previous time count s−1. At this time, if the values do not match, the printer 600 proceeds to S1503 and selects the sensor data at time count s as data for learning or inference. If the values match, the printer 600 returns to S1501 and repeats the processing. That is, in a case where a value of sensor data at a comparison target time is different from a value of data a predetermined time before the comparison target time, the printer 600 selects the sensor data at the comparison target time as data for learning or inference.

In S1504, if a selected data length reaches x, the printer 600 performs the processing from S1215 or S1314 onward using the selected data as input. At this time, the data length x is any value and may be appropriately determined so as to improve the inference accuracy of the learning model. Further, the sensor data may include not only a value measured by the sensor but also a date and time of the measurement. In this example, the value is compared with the value of sensor data one time count before in S1502, but the value may be compared with the value of sensor data n counts before. Further, processing may be performed such that data is absolutely selected in a period corresponding to m counts after the mismatch between the value and the value of the sensor data n counts before for reducing the number of determinations in S1502.

Other Embodiments

In the embodiments described above, the apparatus to be a target of determination of abnormality prediction processing is the printer 600. However, the apparatus to be a target of abnormality determination is not limited to this and may be any device 400 other than the printer 600 as long as a period during which the apparatus is active is not fixed and is variable according to user operation or the like.

Further, although the description has been given of the example in which the input data in the learning stage and the inference stage is time-series data obtained from a sensor, the input data may be time-series data after the execution of predetermined processing for data obtained from a sensor.

Further, although the description has been given of the example in which the abnormality determination threshold is a statistical value of validation data at the time of generation of the learning model 252, the abnormality determination threshold is not limited to this. The abnormality determination threshold may be determined further in consideration of a statistical value of a prediction error used for the determination processing using the learned model 352.

The data selection condition determination processing (S1213, S1312) described in the above embodiments can be performed in various forms. For example, the data selection condition may be a condition that the operation panel 605 accepts a specific operation. For example, the operation panel 605 may be provided with an execution button of learning and an execution button of inference such that sensor data is selected and learning or inference is performed only at the push of the execution button. Alternatively, sensor data may be selected and learning and inference may be performed only in a case where the operation panel is operated to cause the printer 600 to perform operation such as printing or maintenance.

Further, the data selection condition determination processing (S1213, S1312) may use video from digital cameras 402 provided inside and outside of the apparatus. For example, data may be selected according to the result of determination based on a determination algorithm using video captured by the digital cameras 402.

Further, the data selection condition determination processing (S1213, S1312) may use voice from voice input/output apparatus 403 provided inside and outside of the apparatus. For example, data may be selected according to the result of determination based on a determination algorithm using voice from the voice input/output apparatus 403.

The present invention can also be realized by processing of supplying a system or apparatus with a program that implements one or more functions of the above embodiments via a network or storage medium and causing a computer of the system or apparatus to read out and execute the program. The present invention can also be realized by a circuit that implements one or more functions (such as an ASIC). The computer may comprise one or more processors or circuits and may include a network of separate computers or separate processors or circuits to read out and execute computer executable instructions.

The processor or circuit may include a central processing unit (CPU), micro processing unit (MPU), graphics processing unit (GPU), application specific integrated circuit (ASIC), and field-programmable gate array (FPGA). The processor or circuit may also include a digital signal processor (DSP), data flow processor (DFP), or neural processing unit (NPU).

The storage medium can also referred to as non-temporary computer readable medium. The storage medium may include one or more of a hard disk (HD), random access memory (RAM), a read only memory (ROM), and a storage of distributed computing systems. The storage medium may also include an optical disk (such as a compact disc (CD), digital versatile disc (DVD), or Blu-ray Disc (BD)™), a flash memory device, and a memory card.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-187646, filed Oct. 11, 2019, which is hereby incorporated by reference wherein in its entirety.

What is claimed is:

1. An information processing system comprising:
one or more hardware processors; and
one or more memories storing instructions to be executed by the one or more hardware processors, the instructions stored in the one or more memories being executable by the one or more hardware processors to cause the information processing system to function as:
an obtaining unit configured to obtain time-series data including data obtained from a device in an active state and data obtained from the device in an inactive state;
a selection unit configured to select time-series data satisfying a condition indicating that the device is active as input data from among the time-series data obtained by the obtaining unit; and
a generation unit configured to generate a learning model based on the input data until a first time selected by the selection unit and teacher data that is data indicating a state of the device at a second time after the first time, and not based on at least part of the time-series data obtained by the obtaining unit other than the input data until the first time selected by the selection unit,
wherein the selection unit selects time-series data as the input data in a case where a specific determination result is achieved by a determination algorithm using video obtained by capturing the device or voice of the device as input.

2. The information processing system according to claim 1, wherein the selection unit selects time-series data that is data in a normal state and satisfies a condition indicating that the device is active as the input data from among the obtained time-series data.

3. The information processing system according to claim 2, wherein the selection unit determines data in a period in which no error occurs as data in the normal state based on a log of the device.

4. An information processing system comprising:
one or more hardware processors; and
one or more memories storing instructions to be executed by the one or more hardware processors, the instructions stored in the one or more memories being executable by the one or more hardware processors to cause the information processing system to function as:
an obtaining unit configured to obtain time-series data including data obtained from a device in an active state and data obtained from the device in an inactive state;
a selection unit configured to select time-series data satisfying a condition indicating that the device is active as input data from among the time-series data obtained by the obtaining unit;
a second obtaining unit configured to obtain, as output data, a prediction value corresponding to a second time after a first time by inputting input data at the first time selected by the selection unit to a learned model and not inputting time-series data not satisfying the condition indicating that the device is active out of the time-series data obtained by the obtaining unit; and
a determination unit configured to determine a state of the device based on the prediction value at the second time obtained by the second obtaining unit and an actual value indicating a state of the device at the second time
wherein the determination unit outputs first information in a case where a displacement amount between the inference value and the actual value at the second time exceeds a predetermined threshold and outputs second information different from the first information in a case where the displacement amount is less than the predetermined threshold,
wherein the predetermined threshold is determined based on validation data used for generating the learned model.

5. The information processing system according to claim 4, wherein the instructions stored in the one or more memories are further executable by the one or more hardware processors to cause the information processing system to function as a control unit configured to output a predetermined display on a display unit based on information output by the determination unit.

6. The information processing system according to claim 5, wherein the control unit outputs a display indicating that the device is abnormal as the predetermined display on the display unit based on the information received by the receiving unit.

7. The information processing system according to claim 4, wherein the predetermined threshold is a statistical value based on a displacement amount between teacher data in the validation data and output data output from a learning model that is a source of generation of the learned model in a case where input data in the validation data is input to the learning model.

8. The information processing system according to claim 4, wherein the predetermined threshold is an average value of the displacement amount.

9. The information processing system according to claim 1, wherein the selection unit determines that the device is active in a case where the device is not at rest, on standby, or during initialization processing.

10. The information processing system according to claim 1, wherein the selection unit selects time-series data at a comparison target time as the input data in a case where a value of data at the comparison target time is different from a value of data a predetermined time before the comparison target time in time-series data obtained by the obtaining unit.

11. The information processing system according to claim 1, wherein the selection unit selects time-series data obtained in a case where specific operation is performed on an operation panel of the device as the input data.

12. The information processing system according to claim 1, wherein data indicating a state of the device is data obtained by detection using a sensor that detects a state of the device.

13. The information processing system according to claim 1, wherein the time-series data is a set of data from a plurality of sensors.

14. The information processing system according to claim 4, wherein the validation data is data for evaluating predication accuracy of the learning model.

* * * * *